Feb. 21, 1956 H. B. FUGE 2,735,524
ELECTRIC CLUTCH-BRAKE DRIVING DEVICES
Filed Feb. 14, 1951 2 Sheets-Sheet 1

WITNESS
N. Leszczak

INVENTOR
Harry B. Fuge
BY
William P. Stewart
ATTORNEY

Feb. 21, 1956 H. B. FUGE 2,735,524
ELECTRIC CLUTCH-BRAKE DRIVING DEVICES
Filed Feb. 14, 1951 2 Sheets-Sheet 2

INVENTOR
Harry B. Fuge
BY
William P. Stewart
ATTORNEY

WITNESS
N. Leszczak

United States Patent Office
2,735,524
Patented Feb. 21, 1956

2,735,524

ELECTRIC CLUTCH-BRAKE DRIVING DEVICES

Harry B. Fuge, Somerville, N. J., assignor to The Singer Manufacturing Company, Elizabeth, N. J., a corporation of New Jersey Application February 14, 1951, Serial No. 210,954

7 Claims. (Cl. 192—18)

This invention relates to electric power transmitters or unitary electric motor and clutch-brake driving devices used as individual drives for industrial sewing or similar small machinery that is started and stopped frequently.

In driving devices of this type, the driven element of the clutch is in the form of a disk which is moved laterally by the operator into engagement with either the driving clutch element or the brake. Interposed between these elements are clutch facings which wear with use and as wear occurs it is necessary for the operator to move the driven clutch element an increasingly greater distance to cause it to engage the driving clutch element or the brake. Adjusting means for the brake has been provided heretofore, but regardless of the amount of instructions received by the mechanic, the brake and driven clutch element would sometimes be adjusted too close to the driving element with the result that when the motor was started and the clutch-brake mechanism actuated the clutch facing would swell, due to the heat generated therein by friction, and "freezing" of the clutch and brake parts would occur which usually results in "burned-out" motor windings.

The object of this invention is to overcome the above difficulty by providing improved means for adjusting the distance between the driving clutch-element and the brake and to provide means wherein it will be almost impossible to adjust the brake so that it will be too close to the driving clutch element.

Other and further objects of the invention will be readily apparent when the following description is considered in connection with the accompanying drawings.

Figure 1:
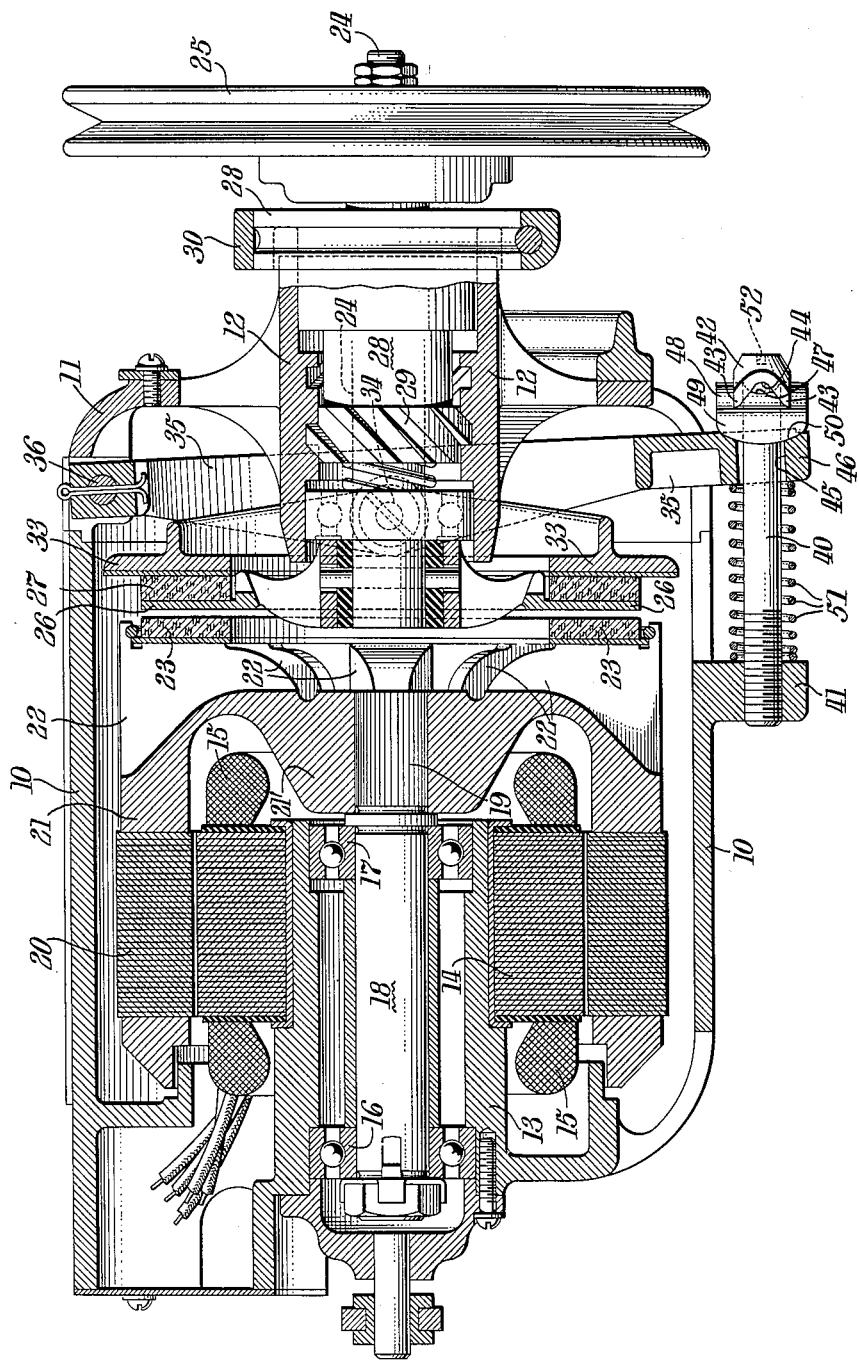
Figure 1 is a longitudinal vertical sectional view taken through the center of an electric motor clutch and brake driving unit embodying my invention.

To illustrate one embodiment of the invention, I have shown a clutch-brake driving device having a frame or casing made of two parts 10 and 11 and forming a hollow cylindrically shaped housing for the working parts of the motor and clutch. The part 11 is formed with a hub 12 and the cup-shaped casing part 10 is formed with an inwardly extending centrally arranged tubular portion 13 on which is press-fitted a stationary electromagnetic element or stator 14 having the usual four-pole, three-phase winding 15. Carried by the tubular portion 13 are the ball bearings 16 and 17 in which is journaled a motor shaft 18 having a knurled portion 19 on its outboard end. The rotary electromagnetic member of the motor is disposed externally of the stationary element 14 and comprises a ring-type squirrel cage rotor 20 secured to a die-cast spider 21 having a hub 21' which is cast upon the knurled portion 19 of the rotary motor shaft 18.

The die-cast spider 21 is formed with a series of blades 22, each having a flat seat which is adapted to receive the driving clutch element 23 of the clutch. Journaled in and extending through the hub 12 of the casing part 11 is an endwise movable shaft 24 carrying a driving pulley 25 on its outboard end, and a driven clutch element 26 on its inboard end. The driven clutch element 26 is adapted for engagement with either the driving clutch element 23 or brake 27 which is carried by a brake-supporting ring 33 pivoted at diametrically opposite points 34 to a member 35 hinged at 36 to the frame part 11. The means for shifting the shaft 24 endwise to cause the driven element 26 to engage either the driving clutch element 23 or the brake 27 comprises a sleeve 28 having threads 29 which cooperate with complemental grooves formed in the hub 12. The sleeve 28 is turned by means of a lever 32 having a split hub 30 which is clamped upon the outboard end of the sleeve 28. The above mechanism is all old and well known and for more detailed description, reference may be had to the patent of Momberg, No. 2,454,471, dated Nov. 23, 1948.

Diametrically opposite thhe pivot 36 is an adjusting screw 40 having a shank which is threaded into a lug 41 formed on the part 10 of the casing. The adjusting screw 40 has a tapered or skirted head 42 formed with four prongs 43 which extend along the shank of the screw 40 and define four V-shaped valleys 44 disposed 90° apart. The shank of the screw 40 extends through an aperture 45 formed in the depending portion 46 of the hinged brake supporting member 35 and through an aperture 47 formed in a saddle shaped member 48 having sides 49 which extend into a suitable depression 50 formed in the depending portion 46 of the brake supporting member 35 (Fig. 4).

The sides 49 of the saddle-member 48 have their marginal edges 50 curved so that the saddle-member 48 may rock relative to the depending portion 46 when the brake supporting member 35 is adjusted to various positions.

Figure 4:
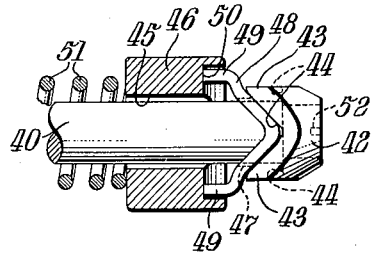
Figure 4 is a detailed view of the means for adjusting the brake.
Figure 5:
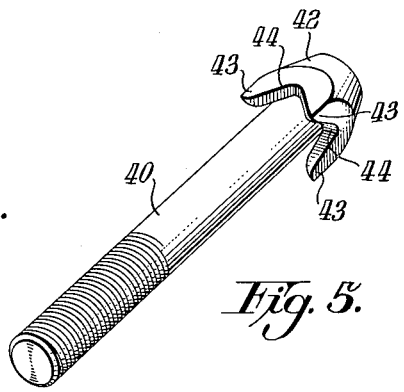
Figure 5 is a perspective view of the brake adjusting bolt.
Figure 3:
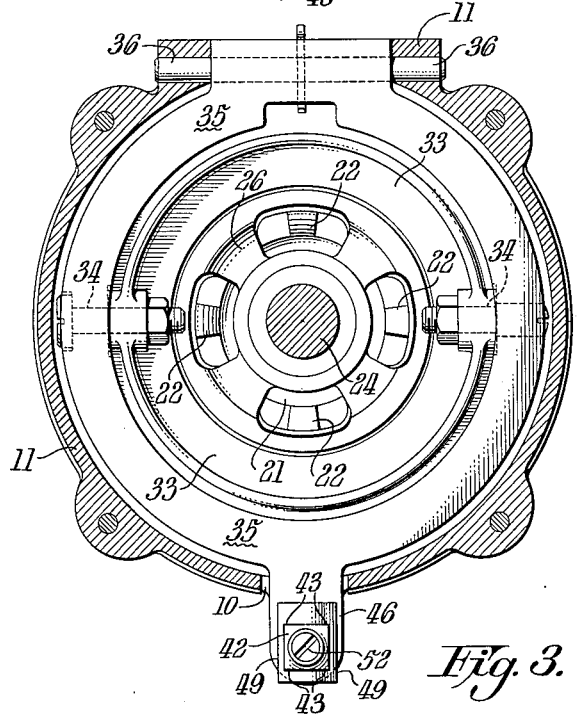
Figure 3 is a sectional view taken substantially along the line 3—3 of Figure 2.
Figure 6:
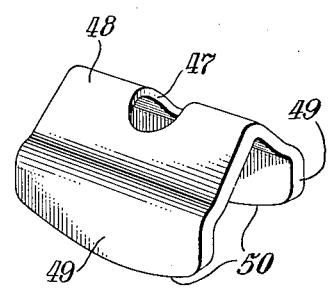
Figure 6 is a perspective view of the saddle with which the head of the adjusting bolt cooperates.

As shown in Figures 1 and 4, the normal operative position of the saddle 49 and the head 42 of the adjusting screw for the brake is such that a pair of the V-shaped grooves 44 in the head 42 straddle the ridge of the saddle 48 and these parts are yieldingly held in this position by a coiled compression spring 51 which embraces the shank of the adjusting screw 40 and reacts between the lug 41 on the frame 10 and the depending portion 46 of the pivoted brake carrying member 35. For the purpose of turning the screw, a screw-driver slot 52 is formed in the head 42, the slot being closed at each end to limit the size of the screw driver which may be used in effecting the adjustment of the screw.

Assuming the parts to be in the position shown in Figure 1, and the clutch and brake faces to have become worn so that adjustment of the parts is desirable in order to decrease the necessary movement of the treadle which is required to shift the driven element into engagement with either the driving element or the brake, a screw driver is inserted in the slot 52 and the screw 40 turned. Upon the intial movement of the screw, the inclined sides of a pair of the V-notches 44 in the head of the screw forces, by a cam action, the saddle member 48 and lower end of the brake supporting member 35 to move to the left as viewed in Fig. 1. This causes the member 35 to swing about its pivot 36 and move the brake 27 and driven element 26 towards the driving element 23. After the tips of the prongs pass over the ridge of the saddle 48, the brake 27 and driven element 26 move away from the driving element under the influence of the spring 51.

Figure 2:
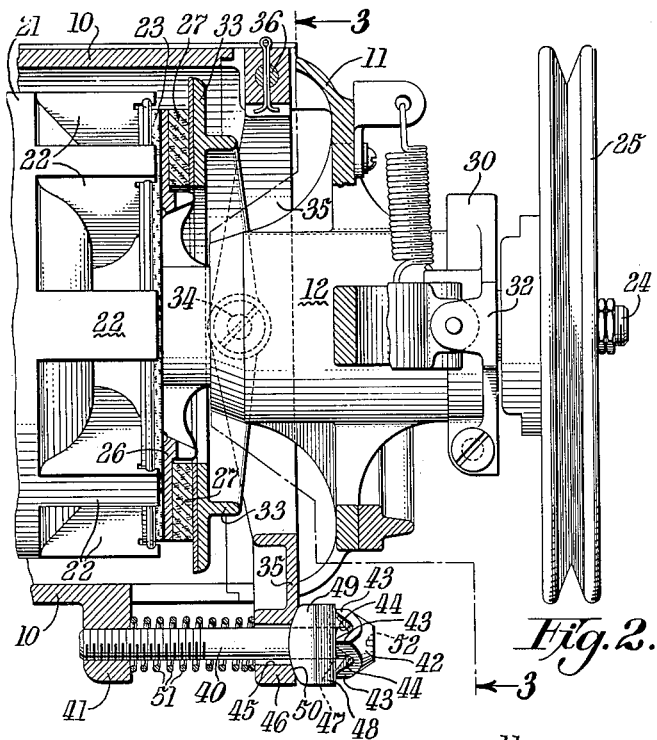
Figure 2 is a vertical section taken through the center of the brake and clutch elements and showing the position of the parts during adjustment.

Each turning movement of the adjusting screw 40 causes the threads on the screw to move the brake and driven clutch element closer to the driving element and to swing back and forth each time the screw 40 is turned 90°. Adjustment continues until the parts reach the position shown in Figure 2 at which time one of the sets of prongs 43 of the screw 40 forces the driven element 26 into contact with the driving element 23 of the clutch and when this occurs the brake carrier 35 cannot be forced further to the left and the prongs will not ride over the peak of the ridge of the saddle 48. When the turning movement of the screw 40 is relieved, by withdrawal of the screw driver, the action of the spring 51, through the coaction of the inclined surface of the saddle and the inclined surface of the V-shaped valleys 44, will force the screw 40 to turn in a counterclockwise direction and the parts to assume the position shown in Figure 4. When the parts are in this position, adjustment has been completed and the optimum distance between the engaged face of the driving element of the clutch and the engaged face of the brake established.

From the above, it will be understood that I have provided an improved means for quickly and accurately adjusting the distance between the friction face of the driving element of a clutch and the friction face of the brake and that the optimum distance between these faces is automatically determined without the use of special tools or measuring devices, also, that the adjusting screw 40 automatically locks itself in its adjusted position.

Having thus set forth the nature of the invention, what I claim herein is:

1. In an electric clutch-brake mechanism having a frame, an electrically actuated driving clutch element, a brake spaced therefrom, a driven clutch element interposed between said driving clutch element and said brake, mechanism for moving said driven clutch element into engagement with either the driving clutch element or the brake, a support for said brake, spring means for biasing said brake support away from said driving clutch element, a screw threaded into said frame and having a skirted head portion formed with feeler prongs, and a member formed with a ridge portion carried by said brake-support and coacting with said feeler prongs, said member and feeler prongs serving to limit the minimum spacing between the driving clutch element and the brake and for locking said screw in its adjusted position.

2. In an electric clutch-brake mechanism having a frame, a driving clutch element located within said frame, a brake located within said frame and laterally spaced from said driving clutch element, a driven clutch element interposed between said driving clutch element and said brake, mechanism for moving said driven clutch element into engagement with either the driving clutch element or said brake, an adjustable member carrying said brake, an adjusting screw threaded into said frame, said screw having a skirted head with a series of notches formed therein, a saddle shaped member coacting with said adjustable brake carrying member and having a ridge portion adapted to cooperate with a pair of said notches, and yieldable means for biasing said adjustable brake carrying and saddle members against the action of said screw.

3. In an electric clutch-brake mechanism having a frame, a driving clutch element located within said frame, a brake located within said frame and laterally spaced from said driving clutch element, a driven clutch element interposed between said driving clutch element and said brake, mechanism for moving said driven clutch element into engagement with either the driving clutch element or said brake, a support for said brake, spring means yieldingly biasing said support in a direction away from said driving clutch-element and clutch and brake adjusting means including a feeler cam device and a coacting brake-support adjusting member step-wise rotatable in a continuous direction alternately to move said brake toward said driving clutch-element and a predetermined extent away from said driving element.

4. In an electric clutch-brake mechanism having a frame, a driving clutch element carried by said frame, a brake carried by said frame and spaced from said driving clutch element, a driven clutch element disposed between said driving clutch element and said brake, a support for said brake mounted on said frame, spring means yieldingly urging said support in a direction away from said driving clutch element, and relatively rotatable brake-support adjusting members, one of said members having a plurality of prongs and the other of said members having a ridge adapted to enter the space between said prongs, said spring means yieldingly biasing said members toward each other.

5. An electric clutch-brake mechanism having a frame, a driving clutch element carried by said frame, a brake carried by said frame and spaced from said driving clutch element, a driven clutch element disposed between said driving clutch element and said brake, a support for said brake pivotally mounted on said frame and yieldingly urged in a direction away from said driving clutch element, and adjusting and feeler means for limiting the minimum spacing between said brake and said driving clutch element including a ridged member carried by said brake support and a screw member having a skirted head portion with diametrically opposed feeler prongs coacting with said ridged member.

6. In an electric clutch-brake mechanism having a frame, a driving flywheel and clutch element carried by said frame, a brake support pivotally fastened to said casing and spaced from said driving clutch element, a driven clutch element disposed between said driving clutch element and said brake, mechanism for moving said driven clutch element into engagement with said driving clutch element and said brake, a screw extending through a portion of said brake support and threaded into said frame, said screw having a skirted head portion formed with feeler prongs, a member carried by said brake support and formed with a ridged portion coacting with said feeler prongs, and a spring urging said brake away from said driving clutch element and holding said ridged member yieldingly in engagement with said feeler prongs, said ridged member and said feeler prongs serving to limit the minimum spacing between the driving clutch element and the brake.

7. An electric clutch-brake mechanism having a frame, a driving clutch element carried by said frame, a brake element carried by said frame and spaced from said driving clutch element, a driven clutch element disposed between said driving clutch element and said brake element, adjusting means for drawing said elements into firm engagement with each other, said adjusting means including a threaded stud provided with a pronged head and a ridged member coacting with said pronged head, a resilient device yieldingly urging said head and said ridged member together and urging said elements apart, and means for preventing firm engagement of said elements when said ridged member is seated between the prongs of said head.

References Cited in the file of this patent

UNITED STATES PATENTS

| | | |
|---|---|---|
| 1,734,935 | Zaccone | Nov. 5, 1929 |
| 1,821,149 | Gallup | Sept. 1, 1931 |
| 2,274,457 | Peets et al. | Feb. 24, 1942 |
| 2,454,471 | Momberg | Nov. 23, 1948 |